(12) United States Patent  (10) Patent No.: US 8,925,420 B2
Wysgol et al.  (45) Date of Patent: Jan. 6, 2015

(54) CENTRIFUGAL PENDULUM MECHANISM

(75) Inventors: Darius Wysgol, Offenburg (DE); David Schnaedelbach, Buehl (DE); Thorsten Krause, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 72 days.

(21) Appl. No.: 13/602,669

(22) Filed: Sep. 4, 2012

(65) Prior Publication Data

US 2013/0233124 A1 Sep. 12, 2013

Related U.S. Application Data

(63) Continuation of application No. PCT/DE2011/000172, filed on Feb. 21, 2011.

(30) Foreign Application Priority Data

Mar. 11, 2010 (DE) .......................... 10 2010 011 140

(51) Int. Cl.
 *F16F 15/14* (2006.01)
(52) U.S. Cl.
 CPC .............. *F16F 15/145* (2013.01); *F16F 15/14* (2013.01)
 USPC ....................................... 74/574.2; 74/574.1
(58) Field of Classification Search
 CPC ................................ F16F 15/145; F16F 15/14
 USPC ...................... 74/574.2, 573 R, 574; 464/180
 See application file for complete search history.

(56) References Cited

U.S. PATENT DOCUMENTS

| 2,348,941 | A | | 5/1944 | Ware | |
| 2,387,776 | A | * | 10/1945 | Salomon | 74/574.2 |
| 6,450,065 | B1 | * | 9/2002 | Eckel et al. | 74/574.4 |
| 2013/0150169 | A1 | * | 6/2013 | Krause et al. | 464/51 |
| 2013/0233125 | A1 | * | 9/2013 | Jung et al. | 74/574.2 |
| 2013/0239745 | A1 | * | 9/2013 | Maienschein et al. | 74/574.2 |
| 2013/0283966 | A1 | * | 10/2013 | Baral et al. | 74/574.2 |

FOREIGN PATENT DOCUMENTS

| DE | 10224874 | 12/2002 | |
| DE | 102004011830 | 9/2004 | |
| DE | 102006028552 | 5/2007 | |
| EP | 1 780 434 A2 * | 5/2007 | F16D 13/58 |
| WO | WO 2010/105589 A1 * | 9/2010 | F16F 15/14 |
| WO | WO 2011/110168 A1 * | 9/2014 | F16F 15/14 |

* cited by examiner

*Primary Examiner* — Vinh Luong
(74) *Attorney, Agent, or Firm* — Simpson & Simpson, PLLC

(57) ABSTRACT

A centrifugal pendulum mechanism having a pendulum flange and pendulum masses, which are fastened by bolts on both sides of the pendulum flange and are guided by rollers and can be pivoted slightly relative to the pendulum flange. At least two pendulum masses are arranged on the pendulum flange so as to be circumferentially adjacent. One pendulum mass has a lateral surface that faces the adjacent pendulum mass, and the contour of the lateral surface is at a substantially acute angle.

9 Claims, 2 Drawing Sheets

CENTRIFUGAL PENDULUM MECHANISM

CROSS-REFERENCE TO RELATED APPLICATIONS

This application is filed under 35 U.S.C. §120 and §365(c) as a continuation of International Patent Application PCT/DE2011/000172, filed Feb. 21, 2011, which application claims priority from German Patent Application No. 10 2010 011 140.6, filed Mar. 11, 2010, which applications are incorporated herein by reference in their entireties.

FIELD OF THE INVENTION

The invention relates to a centrifugal pendulum mechanism.

BACKGROUND OF THE INVENTION

Such centrifugal pendulum mechanisms are, for example, known as torsional vibration dampers in terms of their effect, especially when used in drivetrains of motor vehicles, for example, from German Patent Application No. 10 2004 011 830 A1. Pendulum masses are arranged with restricted pivoting on a pendulum flange that is driven by a drive unit, such as an internal combustion engine that is subject to torsional vibrations. A quenching effect of the torsional vibration arises as a result of the pendulum motion of the pendulum masses generated by the differing angular acceleration of the pendulum flange.

The pendulum flange can, for example, be designed to be integral with a component of a torsional vibration damper or a dual-mass flywheel, or it can be arranged on one of these components. Pendulum masses can be arranged on both sides of the pendulum flange, where axially opposing pendulum masses are connected to each other by means of bolts. The bolts move in openings that have a shape, which is adapted to the pendulum motion of the pendulum masses. The pendulum masses are guided in the pendulum flange by means of cutouts introduced there that are complementary with the cutouts in the pendulum flange, and rollers roll in the cutouts. While the centrifugal pendulum device is operating, the pendulum masses can impact each other while the pendulum flange is rotating. When the pendulum flange switches from rotating to stationary, one pendulum mass can strongly impact the circumferentially neighboring pendulum mass, which can lead to annoying noises in the centrifugal pendulum device.

BRIEF SUMMARY OF THE INVENTION

The object of the invention is to improve the noise quality of a centrifugal pendulum device while optimally utilizing the installation space, preferably by damping or avoiding the impact between circumferentially adjacent pendulum masses.

Accordingly, a centrifugal pendulum mechanism is proposed having a pendulum flange and pendulum masses, which are fastened by means of bolts on both sides of the pendulum flange and are guided by means of rollers and can be pivoted slightly relative to the pendulum flange, where at least two pendulum masses are arranged on the pendulum flange so as to be circumferentially adjacent, and one pendulum mass has a lateral surface that faces the adjacent pendulum mass, and the contour of the lateral surface is at a substantially acute angle. When the pendulum masses contact each other while the pendulum flange is rotating and/or when the pendulum flange transitions from rotating to stationary, this can cause one pendulum mass to smoothly glide off the circumferentially adjacent pendulum mass. The contour of the lateral surface can be designed such that two neighboring pendulum masses can execute a very expansive pendulum movement relative to the pendulum flange while the centrifugal pendulum mechanism is operating and not contact the pendulum masses.

In one embodiment of the invention, the contours of two facing lateral surfaces of adjacent pendulum masses are at an acute angle. The contour of the lateral surface of a pendulum mass is preferably designed to symmetrically mirror the contour of the neighboring lateral surface of the adjacent pendulum mass with reference to a radial line. The edge of the contour can be rounded if two adjacent pendulum masses first contact each other with the edge under certain circumstances. However, the contour can be designed so that edge-to-edge contact is highly improbable.

In another embodiment of the invention, two lateral surfaces of a pendulum mass are connected to each other radially to the outside by an outer surface and radially to the inside by an inner surface, where the acute angle of the contour of the lateral surface is enclosed between the outer surface or the inner surface and the lateral surface.

In another embodiment of the invention, two lateral surfaces of a pendulum mass are connected to each other radially to the outside by an outer surface and radially to the inside by an inner surface, where the acute angle of the contour of the lateral surface is formed within the lateral surface. The acute angle of the contour of the lateral surface is preferably formed substantially radially in the middle of the lateral surface.

In yet another embodiment of the invention, the two lateral surfaces of a pendulum mass each have an acute angle in their contour, where one contour is designed to symmetrically mirror the other contour relative to a radial line. One contour can also be designed to be asymmetrical to the other contour of a common pendulum mass relative to a radial line.

Additional advantages and advantageous embodiments of the invention are found in the description and figures that, for the sake of clarity, are not reproduced true to scale. All of the explained features can be used in the indicated combination as well as in other combinations or by themselves, without departing from the scope of the invention.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
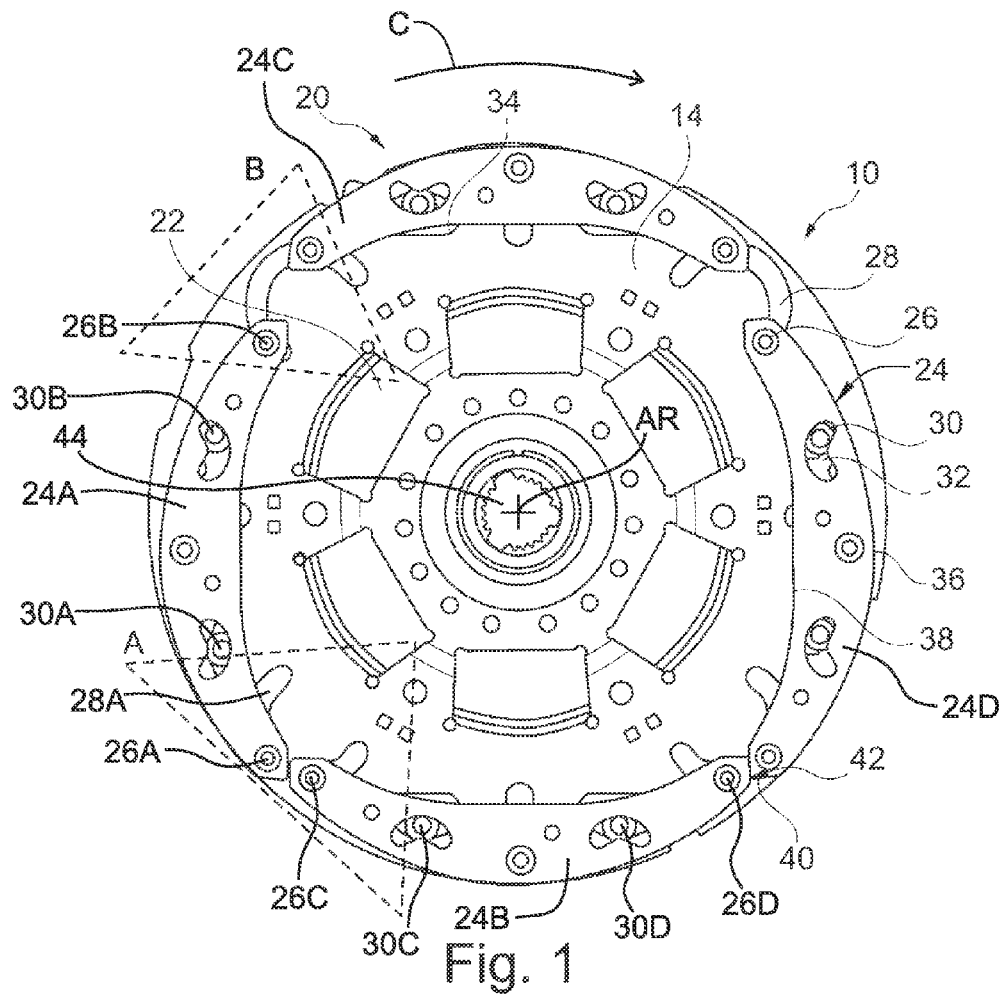
FIG. 1 is a side view of a centrifugal pendulum mechanism arranged on a component of a torsional vibration damper in a special embodiment of the invention.
Figure 2:
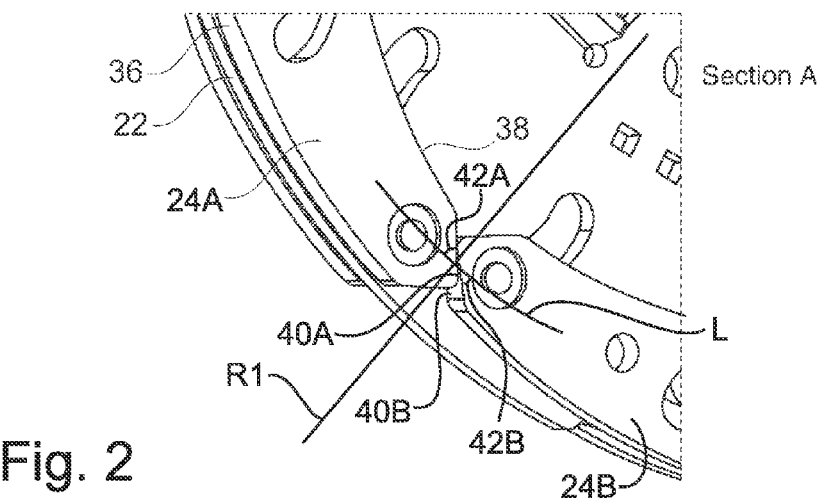
FIG. 2 is a three-dimensional detailed view of section A of FIG. 1.
Figure 3:
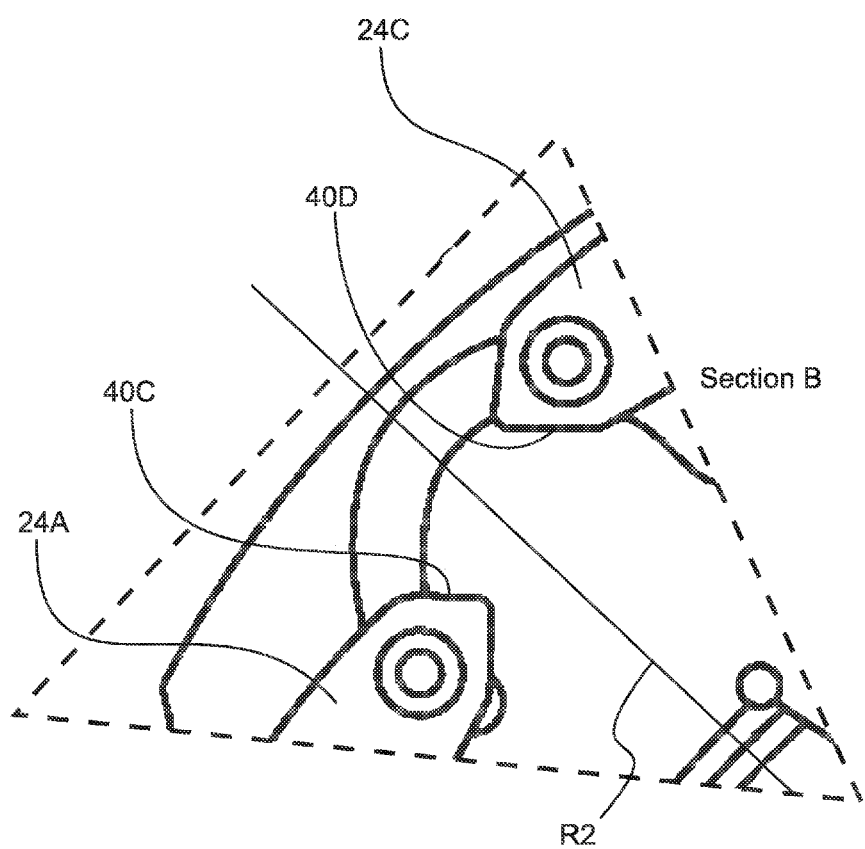
FIG. 3 is a detailed view of section B of FIG. 1.

FIG. 1 shows a side view of a component of torsional vibration damper 10. FIG. 2 is a three-dimensional detailed view of section A of FIG. 1. FIG. 3 is a detailed view of section B of FIG. 1. This component is designed as a damper flange that has window cutouts 12 to accommodate energy storage elements such as helical springs in an area radially to the inside. The damper flange also forms pendulum flange 22 of centrifugal pendulum mechanism 20, where two pendulum masses 24 are arranged axially on each side of pendulum flange 22 and are connected to each other by means of bolts 26 to a pair of pendulum masses. Bolts 26 extend through cutouts 28 in pendulum flange 22, where cutouts 28 are designed in the shape of an arc such that they enable a pendulum movement of pendulum masses 24 relative to pendulum flange 22. Pendulum masses 24 are guided on rolling elements 30 relative to pendulum flange 22, and rolling elements 30 can roll in cutouts 32 in pendulum masses 24 and in complementary cutouts 34 in pendulum flange 22. Pendulum mass 24A is connected to pendulum flange 22 by bolts 26A and 26B. Pendulum mass 24B is connected to pendulum flange 22 by bolts 26C and 26D. Rolling elements 30A and 30B guide pendulum mass 24A. Rolling elements 30C and 30D guide pendulum mass 24B. Rolling elements 30A and 30B are circumferentially between bolts 26A and 26B. Rolling elements 30C and 30D are circumferentially between bolts 26C and 26D. Bolts 26A and 26C are located in C-shaped cutout 28A.

As shown in greater detail in FIG. 2, pendulum mass 24 has outer surface 36 radially to the outside and inner surface 38 radially to the inside. The circumferential sides of pendulum mass 24 are bordered by lateral surfaces 40. Two lateral surfaces 40 of pendulum mass 24 and a pendulum mass circumferentially adjacent thereto face each other. The contour of lateral surface 40 has acute angle 42 substantially in the center relative to the radial extension of lateral surface 40, as well as the neighboring lateral surfaces of the adjacent pendulum mass. The contours of the lateral surfaces of each adjacent pendulum mass as well as the contours of the two lateral surfaces of one pendulum mass are designed to symmetrically mirror each other with reference to radial lines, such as R1 or R2. In a first position, as shown in FIG. 2, radial Radial line R1, orthogonal to axis of rotation AR, passes through respective surfaces 40A and 40B for adjacent masses 24A and 24B, respectively. Circumferential line L passes through surfaces 40A and 40B for adjacent masses 24A and 24B, respectively. In the first position, as shown in FIG. 3, radial line R2 passes between respective surfaces 40C and 40D for adjacent masses 24A and 24C, respectively. Acute angles 42A and 42B, for surfaces 40A and 40B, respectively, also are with respect to line L. Axis of rotation AR passes through central opening 44. Pendulum mass 24A is adjacent pendulum mass 24C in circumferential direction C and pendulum mass 24D is adjacent to pendulum mass 24C in direction C. In the first position, surfaces 40A and 40B are in contact and surfaces 40C and 40D are not in contact.

The two facing lateral surfaces can be at a certain fixed or changing distance from each other while centrifugal pendulum mechanism 20 is operating, where under certain circumstances, the lateral surfaces of the two pendulum masses can contact each other. The special, pointed design of the contour of the lateral surface can keep the pendulum masses from impacting each other since the pendulum masses can glide past each other in sections due to the contour of the pendulum mass acting as a guide.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

10 Torsional vibration damper
12 Window cutouts
20 Centrifugal pendulum mechanism
22 Pendulum flange
24 Pendulum masses
26 Bolt
28 Cutouts
30 Rolling element
32 Cutouts
34 Cutouts
36 Outer surface
38 Inner surface
40 Lateral surface
42 Acute angle
44 Central opening

What is claimed is:

1. A centrifugal pendulum mechanism, comprising:
a rotational axis;
a pendulum flange; and,
first and second pendulum masses, wherein:
the first and second pendulum masses are fastened by respective pluralities of bolts on both sides of the pendulum flange and are guided by respective pluralities of rolling elements in response to at least one force, the first and second pendulum masses pivot relative to the pendulum flange;
the first and second pendulum masses are arranged on the pendulum flange so as to be circumferentially adjacent;
the first pendulum mass has a first lateral surface;
the second pendulum mass has a second lateral surface that faces the first lateral surface in a circumferential direction;
the respective contours of the first and second lateral surfaces are at an acute angle with respect to a circumferential line; and,
for respective first positions for the first and second pendulum masses, a radial line passes through the first and second lateral surfaces.

2. The centrifugal pendulum mechanism as recited in claim 1, wherein a contour of the first lateral surface is designed to symmetrically mirror a contour of the adjacent second lateral surface relative to the radial line.

3. The centrifugal pendulum mechanism as recited in claim 1, wherein:
- the first pendulum mass includes a third lateral surface; and,
- the first and third lateral surfaces are connected to each other radially to the outside by an outer surface and radially to the inside by an inner surface; and,
- the acute angle of a contour of the first lateral surface is enclosed between the outer surface and the inner surface and the first lateral surface.

4. The centrifugal pendulum mechanism as recited in claim 1, wherein:
- the first pendulum mass includes a third lateral surface;
- the first and third lateral surfaces are connected to each other radially to the outside by an outer surface and radially to the inside by an inner surface; and,
- the acute angle of a contour of the first lateral surface is enclosed within the first lateral surface.

5. The centrifugal pendulum mechanism as recited in claim 4, wherein the acute angle of the contour of the first lateral surface is formed substantially radially in the middle of the first lateral surface.

6. A centrifugal pendulum mechanism, comprising:
- an axis of rotation;
- a pendulum flange including:
  - a central opening through which the axis of rotation passes; and,
  - a "C" shaped cutout with first and second ends closer to the axis of rotation than a middle portion connecting the first and second ends;
- a first pendulum mass:
  - connected to the pendulum flange by first and second bolts; and,
  - including a first lateral surface at an acute angle with respect to a circumferential line;
- a first plurality of rolling elements:
  - circumferentially located between the first and second bolts; and,
  - guiding the first pendulum mass relative to the pendulum flange;
- a second pendulum mass:
  - connected to the pendulum flange by third and fourth bolts; and,
  - including a second lateral surface at the acute angle with respect to the circumferential line; and,
- a second plurality of rolling elements:
  - circumferentially located between the third and fourth bolts; and,
  - guiding the second pendulum mass relative to the pendulum flange, wherein:
    - the first bolt is located in the "C" shaped cutout;
    - the third bolt is located in the "C" shaped cutout; and,
    - in a first position for the first and second pendulum masses, a radial line passes through the first and second lateral surfaces.

7. The centrifugal pendulum mechanism of claim 6, wherein in the first position, the first and second lateral surfaces are in contact.

8. A centrifugal pendulum mechanism, comprising:
- an axis of rotation;
- a pendulum flange including a central opening through which the axis of rotation passes;
- a first pendulum mass:
  - connected to the pendulum flange by a first plurality of bolts; and,
  - including a first lateral surface at an acute angle with respect to a circumferential line;
- a first plurality of rolling elements guiding the first pendulum mass relative to the pendulum flange;
- a second pendulum mass:
  - connected to the pendulum flange by a second plurality of bolts; and,
  - including a second lateral surface at the acute angle with respect to the first circumferential line;
- a second plurality of rolling elements guiding the second pendulum mass relative to the pendulum flange;
- a third pendulum mass adjacent to the first pendulum mass in a circumferential direction; and,
- a fourth pendulum mass adjacent to the third pendulum mass in the circumferential direction, wherein:
  - in a first position for the first and second pendulum masses:
    - the first and second lateral surfaces are in contact;
    - a radial line passes through the first and second lateral surfaces; and,
    - the third and fourth pendulum masses are free of contact with each other.

9. The centrifugal pendulum mechanism of claim 8, further comprising:
- a third plurality of bolts connecting the third pendulum mass to the pendulum flange;
- a third plurality of rolling elements guiding the third pendulum mass relative to the pendulum flange;
- a fourth plurality of bolts connecting the fourth pendulum mass to the pendulum flange; and,
- a fourth plurality of rolling elements guiding the fourth pendulum mass relative to the pendulum flange.

\* \* \* \* \*